United States Patent [19]
Lambert et al.

[11] Patent Number: 4,620,710
[45] Date of Patent: Nov. 4, 1986

[54] HEAD GASKET FOR AN INTERNAL-COMBUSTION ENGINE

[75] Inventors: Georges Lambert, Lyon; Guy Ferré, Saint-Priest, both of France

[73] Assignee: Curty, Saint-Priest, France

[21] Appl. No.: 727,960

[22] Filed: Apr. 26, 1985

[30] Foreign Application Priority Data

Apr. 26, 1984 [FR] France .................. 84 06908

[51] Int. Cl.[4] ................................ F16J 15/12
[52] U.S. Cl. .................... 277/235 B; 277/1; 277/234
[58] Field of Search .............. 277/1, 227–229, 277/233, 234, 235 R, 235 A, 235 B, 236

[56] References Cited

U.S. PATENT DOCUMENTS

| 1,472,133 | 10/1923 | Oven | 277/235 B X |
| 1,985,473 | 12/1924 | Victor | 277/235 B |
| 3,430,611 | 3/1969 | Belter | 277/235 B X |
| 4,325,559 | 4/1982 | Czernik et al. | 277/235 B |

FOREIGN PATENT DOCUMENTS

| 1426150 | 12/1965 | France | 277/235 B |
| 55-146254 | 11/1980 | Japan | 277/235 B |
| 2092244 | 8/1982 | United Kingdom | 277/235 B |

*Primary Examiner*—Robert S. Ward
*Attorney, Agent, or Firm*—Karl F. Ross; Herbert Dubno

[57] ABSTRACT

A cylinder head gasket for an automotive vehicle has its fire ring constituting a principal part of the gasket attached at spaced apart locations to a pair of lateral parts onto which respective elastomeric seals can be molded independently.

11 Claims, 4 Drawing Figures

HEAD GASKET FOR AN INTERNAL-COMBUSTION ENGINE

FIELD OF THE INVENTION

My present invention relates to a head gasket for an internal-combustion engine and, more particularly, to a gasket adapted to be provided between the cylinder head and cylinder block of an internal-combustion engine and which is provided with a plurality of passages for various fluids, holes adapted to be traversed by the bolts affixing the cylinder head to the cylinder block and at least one hole, the periphery of which is lined with metal, serving to delimit a cylinder bore of the internal-combustion engine.

BACKGROUND OF THE INVENTION

Head gaskets for internal combustion engines must be designed to withstand the high temperature which are generated in the engine and have, therefore, been formed in the past from composite materials and materials which, like asbestos, are resistant to high temperatures.

Since such gaskets are required to seal fluid passages which may be under pressure and which can be traversed by a variety of fluids, the gasket must be capable of withstanding these substances as well. The gaskets also must be capable of withstanding significant compressive forces of the type required to effect a perfect seal so that various fluids do not intermingle and so that leakage to the outside or into the cylinder is prevented. The seal must also be capable of maintaining the pressure within the cylinder so that there is no loss of compression, and in addition, must be capable of limited deformation so as to compensate for manufacturing tolerances and planetary differences of the mating surfaces of the cylinder head and the cylinder block onto which the cylinder head is mounted.

A cylinder head gasket for this purpose can comprise a generally planar body which, around at least the cylinder-bore hole, is formed as a so-called fire ring with a metal lining for the compressible material which otherwise forms the body of the gasket.

This body is provided not only with the hole adapted to seal the cylinder bore and to form the fire ring, but also with an assortment of other holes for the various purposes described.

Certain of these holes, for example, can be traversed by coolant, generally a water/glycol mixture or some other antifreeze or coolant composition.

Other holes are provided to communicate between the lubricant passages in the cylinder block and the cylinder head and are thus traversed by the engine oil. Still other holes, of course, are traversed by the bolts which secure the cylinder head to the cylinder block.

While it is possible for automotive engines generally to utilize a single head gasket for a row of cylinders and a respective cylinder head, it also has been proposed, especially, for heavy-duty engines, to provide a plurality of cylinder heads, each of which can be assigned to at least one cylinder and which is provided with a respective head gasket. In this case, the head gasket has a central opening which is aligned with the cylinder and a pair of lateral wings or regions, each of which can be provided with a plurality of the fluid ports previously mentioned and with respective holes for the corresponding bolts.

The latter construction is particularly of interest because it permits the same head gasket to be used for various types of engines, e.g. V-6, V-8, in-line 6 or in-line 8 engines, regardless of the engine construction (V or in-line) and regardless of the number of cylinders.

In practice although the number of gasket elements which may be required for an engine is increased, the overall cost is reduced because the number of different types of gaskets which may be stocked is less and the unit cost of the gasket, of course, also less, or possibly even lower than the per cylinder cost of a gasket adapted to be used for a multiple cylinder head.

With these gaskets as well, a fire ring is provided around the opening or openings to be traversed by hot gases, i.e. the cylinder opening or openings. It is also possible to surround the openings which are to constitute liquid passages with borders or ribs of elastomeric material to increase the resilience in these regions and the sealing effectiveness. The balance of the gasket, constituting the body thereof, should be composed of a material which should, if possible, be free from asbestos, because of the detrimental effects of this mineral, but having a good resistance to gas and to heat. Indeed, the body or central plate can be composed of a metal of good quality.

The elastomeric cords or ribs can be molded onto the metal body in a mold into which the body is inserted and it has been the practice, as a consequence, to accommodate the entire gasket body including the portion forming the cylinder opening in the mold to enable the molding of the elastomeric sealing ribs thereon.

This molding operation may include a central distribution of the molding material to the recesses in the mold parts in which the sealing strips are to be formed. The closure of the mold is effected by a press and it is difficult to accommodate in a single mold or in a single molding press, more than one or at most a few gasket bodies because of the size of the body which must be incorporated in the mold.

As a consequence, one must either make use of extremely large presses with comparatively high capital cost, or a number of presses with correspondingly high investments.

Another disadvantage of conventional gaskets of this type is that the proximity of the fire ring to the sealing rings is such that there is a significant conduction of heat to the latter so that the elastomeric materials which are used must have a refractory characteristic themselves, i.e. must be of a quality enabling them to resist elevated temperatures which may be as high as 250° C. This of course requires the use of elastomers that are highly expensive and which require significant polymerization times so that the manufacturing cost is considerable and the rate of manufacture is limited.

OBJECTS OF THE INVENTION

It is, therefore, the principal object of the present invention to provide an improved head gasket for an internal-combustion engine which obviates the aforedescribed disadvantages.

More specifically it is an object of this invention to provide a head gasket which is of simple and economical construction and which nevertheless satisfies the desiderata for such head gaskets as outlined previously.

A further object of my invention is to provide a gasket for the purposes described which can be realized simply and economically and which also manifests excellent performance.

SUMMARY OF THE INVENTION

These objects and others which will become apparent hereinafter are attained, in accordance with the invention in a gasket which is formed from three independent parts and is equipped with respective sealing means which can be independent of one another, namely, a principal or central part in which the cylinder opening is formed and which defines the fire ring, and two lateral parts provided with the openings for the lubricating and coolant fluid passages, the latter being surrounded by sealing ribs or borders, the two lateral parts being affixed to the central part subsequent to the molding or other attachment of the respective sealing ribs thereon.

This arrangement allows the molding of the elastomer ribs or borders to be effected on comparatively small bodies, thereby reducing the molding costs significantly, especially since a large number of the molded articles can be made in a mold of comparatively small size or because a comparatively large number of molds can be accommodated in a single press. It is not required to include the central portion defining the cylinder opening in the press.

Indeed, because the lateral parts are fabricated independently of the central part, the body of the lateral parts can be composed of a different material, i.e. metal, than the metal constituting the body or fire ring of the central part. For example, the metal constituting the central part can have a higher refractory quality than that from which the lateral part is formed. I am therefore able to additionally provide economies as to the materials from which the gasket is made.

The attachment of the two lateral parts to the central part may be effected by various techniques including welding, soldering or hooking.

It is another advantage of the present invention that the central part is connected to each of the lateral parts at junctions only at the attachment points so that heat transfer between the central part and the lateral parts is minimized. In fact, measurements have shown that while the fire ring may attain considerable temperatures, the temperatures measured at the lateral parts are significantly less and in use the temperatures of the body of the gasket carrying the elastomeric seals are substantially lower than those attained with conventional seals. As a consequence, the elastomers which are used can be less expensive elastomers which need not be as resistant to high temperatures as those which have been required heretofore. Furthermore, with the elastomers which can be used in accordance with the present invention, the polymerization time is significantly reduced and this allows the production rate to be increased and the cost of production to be reduced still further.

Of no little importance, of course, is the fact that the reduction in heat transfer to the lateral parts reduces thermal deterioration thereof significantly.

According to a feature of the invention, the central part is formed with lugs projecting radially outwardly and serving as attachment points for the lateral parts, the lugs being spaced apart around the periphery of the fire ring. The lugs may form part of the fire ring or of a body around which the fire ring is folded, and the fire ring may be formed without such a body if desired.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
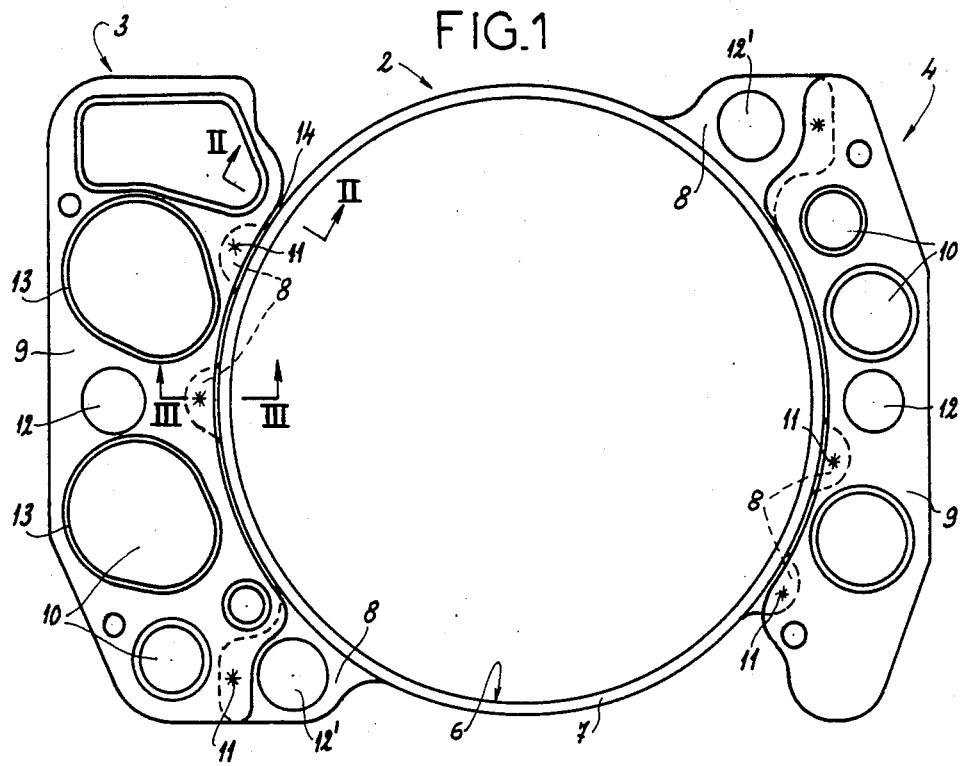
FIG. 1 is a plan view of a gasket according to the invention.

The gasket shown in FIG. 1 is of the type which can be applied between a cylinder head and a cylinder block of an engine having a plurality of cylinders, each of which is provided with its own gasket.

The gasket comprises a central part 2 and two lateral parts 3 and 4.

Figure 2:
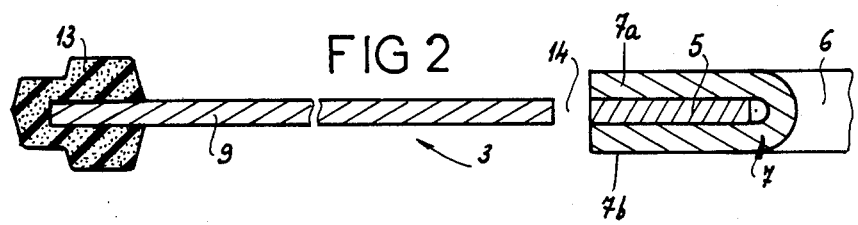
FIG. 2 is a section taken along the line II—II of FIG. 1 in a region in which there is a gap between the fire ring and one of the lateral parts.
Figure 3:
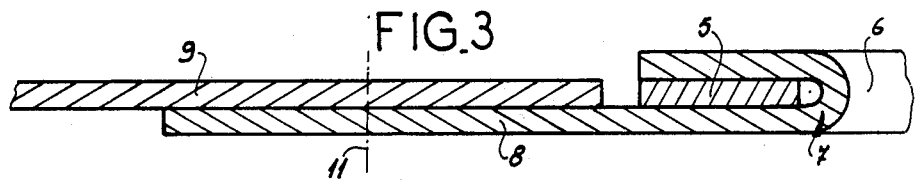
FIG. 3 is a section taken along the line III—III of FIG. 1 through one of the attachment points.

The central part 2 shown in FIGS. 1-3 comprises a metallic core or body in the form of a plate 5 which defines an opening 6 adapted to surround the cylinder and hence the combustion chamber of the engine. The passage 6 is lined with a fire ring 7 consisting of a refractory metal which is folded over the annulus 5.

The fire ring 7, moreover, is of U-section with flanges 7a and 7b, the latter flange being extended with lateral lugs 8, six of which have been shown in peripherally spaced relationship in FIG. 1.

Each of the lateral parts 3, 4, comprises a metallic core or body 9 which is provided with a number of openings 10 adapted to be traversed by the engine coolant and the engine lubricant. In addition, they are provided with bores or openings 12 through which bolts can be passed, to secure the cylinder head to the cylinder block.

The liquid seals around the openings 10 are effected by ribs or cords 13 of elastomeric material which are molded onto the body 9. These ribs can have generally trapezoidal cross sections as can be seen from FIG. 2.

Each of the lateral parts 3, 4 is spot welded at 11 to the respective lugs 8 so that the connection between the central part and each lateral part is effected only in the region of the lugs and as FIGS. 1 and 2 clearly show, a gap 14 which can be of the order of 0.5 mm can remain in regions between the connection points. This results in a significant reduction in heat transmission by conductivity from the fire ring toward the lateral parts and thus a material reduction in the degradation of the seals 13.

As is also apparent from FIG. 1, at least one of the lugs 8 on each side of the fire ring is provided with a bore 12' traversed by one of the attachment bolts, thereby ensuring a precise positioning and anchoring of the fire ring as well as the remainder of the gasket in use.

Figure 4:
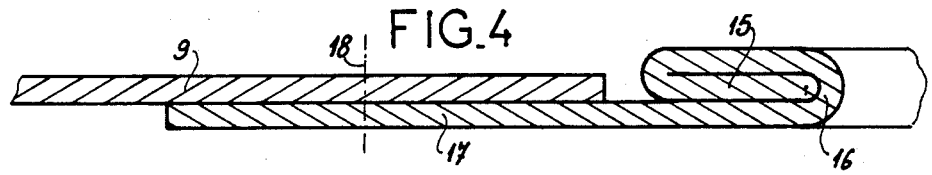
FIG. 4 is a view similar to FIG. 3 but illustrating a different fire ring construction, FIGS. 2-4 being drawn to a larger scale than FIG. 1.

In the embodiment shown in FIG. 4, the core 5 of the fire ring is eliminated and the body of the fire ring is formed by opening inwardly a margin 15 of the metal plate forming the fire ring. The fire ring 16 here also has lugs 17 which can be attached at spot weld 18 of the metal plate 9.

Other attachment systems, as described, can also be used and, for example, instead of spot welding some other welding or soldering technique can be utilized and it is also possible to utilize heat-resistant cement to form the junction. The lugs can also be hooked into slots, for example, or hooked formations of the body 9.

The invention provides, therefore, improvements not only in the gasket itself, but also in the method of forming the gasket and limits heat transfer which can cause premature deterioration of the liquid holes.

The number of attachment points can be increased or reduced and the principles of the invention can be applied to multiple cylinder gaskets in which, for example, the lateral parts can chain together a number of fire rings. The orientation and organization of the openings can also be modified from the illustrations thereof.

I claim:

1. An engine-head gasket adapted to be disposed between a cylinder head and a cylinder block for at least one cylinder, comprising:
   a principal part formed with a cylinder opening and a fire ring surrounding said opening;
   at least two lateral parts flanking said principal part, each of said lateral parts being formed as a plate having a plurality of openings adapted to be traversed by respective liquids, and at least one bore adapted to pass a bolt connecting said head with said block, said openings of said lateral parts being lined with elastomeric sealing ribs molded onto said plates; and
   means for fastening said lateral parts to said principal part.

2. The gasket defined in claim 1 wherein said means for fixing said lateral parts to said prinicial part includes means for attaching said lateral parts to said principal part at spaced apart locations whereby a gap is formed between said lateral parts and said principal part between said locations.

3. The gasket defined in claim 2 wherein said principal part is formed with respective lugs at each of said lugs attached to the body of the respective lateral part.

4. The gasket defined in claim 3 wherein said bodies are spot welded to said lugs.

5. The gasket defined in claim 3 wherein said principal part comprises a metal annulus, said fire ring being folded over said annulus.

6. The gasket defined in claim 3 wherein said fire ring is formed by folding a pair of flanges around a marginal portion of a piece of metal to define said fire ring.

7. The gasket defined in claim 3 wherein at least one of said lugs is formed with a bore adapted to be traversed by one of said bolts.

8. The gasket defined in claim 3 wherein a clearance of an order of 0.5 mm is formed between said principal part and each of said lateral parts in regions between locations at which said lateral parts are connected to said principal part.

9. A method of making a head gasket adapted to be received between a cylinder head and a cylinder block of an engine which comprises the steps of:
   forming a principal gasket part with a fire ring by folding sheet metal in a U-cross section to produce a fire ring around a cylinder opening;
   molding onto metal bodies around respective liquid openings, elastomeric sealing ribs to form at least a pair of lateral parts; and
   thereafter attaching said lateral parts to said principal part on opposite sides of said principal part to form said gasket.

10. The method defined in claim 9 wherein said fire ring is formed with a plurality of spaced apart laterally extending lugs, said bodies being attached to said lugs.

11. The method defined in claim 10 wherein said bodies are spot welded to said lugs.

* * * * *